(12) United States Patent
Rithener et al.

(10) Patent No.: US 8,770,094 B2
(45) Date of Patent: Jul. 8, 2014

(54) BEVERAGE PREPARATION MACHINE FOR LARGE SIZE BEVERAGES

(75) Inventors: Blaise Rithener, La Tour-de-Peilz (CH); Christian Jarisch, Lutry (CH); Antoine Cahen, Lausanne (CH); Alain Jaccard, Ste-Croix (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 13/576,122

(22) PCT Filed: Feb. 2, 2011

(86) PCT No.: PCT/EP2011/051444
§ 371 (c)(1),
(2), (4) Date: Jul. 30, 2012

(87) PCT Pub. No.: WO2011/095502
PCT Pub. Date: Aug. 11, 2011

(65) Prior Publication Data
US 2012/0298258 A1 Nov. 29, 2012

(30) Foreign Application Priority Data
Feb. 3, 2010 (EP) .................................. 10152556

(51) Int. Cl.
*A47J 31/04* (2006.01)
*A47J 31/00* (2006.01)
(52) U.S. Cl.
CPC ..................................... *A47J 31/00* (2013.01)
USPC ................. 99/294; 141/99; 141/100; 99/279; 99/295; 99/304
(58) Field of Classification Search
USPC .............. 141/99, 100, 105, 285; 99/279, 294, 99/295, 304
See application file for complete search history.

(56) References Cited

U.S. PATENT DOCUMENTS

| 4,064,795 A * | 12/1977 | Ackerman | 99/304 |
| 4,147,097 A * | 4/1979 | Gregg | 99/283 |
| 5,025,714 A * | 6/1991 | Brewer | 99/300 |
| 5,584,229 A * | 12/1996 | Anson | 99/280 |
| 6,701,826 B2 * | 3/2004 | Wu | 99/305 |
| 7,131,369 B2 * | 11/2006 | Gantt et al. | 99/289 R |
| 2002/0129712 A1 * | 9/2002 | Westbrook et al. | 99/279 |
| 2003/0066431 A1 * | 4/2003 | Fanzutti et al. | 99/279 |
| 2009/0022864 A1 * | 1/2009 | Steenhof et al. | 426/433 |

FOREIGN PATENT DOCUMENTS

| EP | 806168 A1 * | 11/1997 | ............ A47J 31/057 |
| WO | 02074144 | 9/2002 | |
| WO | 03030696 | 4/2003 | |
| WO | 2006080844 | 8/2006 | |

OTHER PUBLICATIONS

PCT International Search Report for Application No. PCT/EP2011/051444 with a Mailing Date of Apr. 26, 2011; 3 pages.
Written Opinion of the PCT International Search Report for Application No. PCT/EP2011/051444 with a Mailing Date of Apr. 26, 2011; 6 pages.

* cited by examiner

*Primary Examiner* — Timothy L Maust
(74) *Attorney, Agent, or Firm* — K&L Gates LLP

(57) ABSTRACT

A beverage preparation machine (1) has a fluid circuit (3-10c) that comprises a liquid flavoring arrangement (9a, 3, 4, 5) for circulating a liquid, such as water, through a flavoring ingredient (2, 2') to flavor this liquid and for dispensing this flavored liquid to a user-receptacle (100). The fluid circuit further comprises a dilution arrangement (9b, 9', 9") for mixing the liquid unflavored with the flavored liquid upon flavoring.

19 Claims, 3 Drawing Sheets

BEVERAGE PREPARATION MACHINE FOR LARGE SIZE BEVERAGES

CROSS REFERENCE TO RELATED APPLICATIONS

The present application is a National Stage of International Application No. PCT/EP2011/051444, filed on Feb. 2, 2011, which claims priority to European Patent Application No. 10152556.6, filed on Feb. 3, 2010, the entire contents of which are being incorporated herein by reference.

FIELD OF THE INVENTION

The present invention relates to a machine for the preparation of a beverage by circulating a liquid via a portion of flavouring ingredient, in particular contained in a pre-portioned ingredient cartridge, the machine being able to prepare large beverages from such a portion.

For the purpose of the present description, a "beverage" is meant to include any liquid food, such as tea, coffee, hot or cold chocolate, milk, soup, baby food, etc. Cartridges designate any enclosure for containing a pre-portioned ingredient whether rigid, such as capsules, or soft or flexible, such as pods, and made of any material, recyclable or non recyclable, biodegradable or non-biodegradable, such as aluminium or plastic, in particular aluminium pods or aluminium capsules.

BACKGROUND ART

There is a consumer demand for drink dispensing machines, such as coffee machines, that can dispense a variety of drinks in receptacles of different sizes. For example, some coffee machines are capable of preparing an espresso coffee or a lungo coffee in a small or medium cup and a "macchiato" coffee in a large glass.

Multi-beverage machines are capable of preparing coffee, milk, cappuccinos and tea and have dedicated outlets for each drink. For example, CH 685 597 discloses a beverage machine which combines an outlet for coffee, an outlet for milk and a water outlet for tea, all outlets being arranged within a diameter of a user-cup located therebelow so that a user always places a cup onto the same spot whichever beverage, i.e. coffee, tea or milk, he requests.

Brewing systems are for example disclosed in EP 0 730 425, EP 0 862 882, EP 1 219 217, EP 1 480 540, EP 1 545 278, EP 1 635 680, EP 1 659 547, EP 1 669 011, EP 1 721 553, EP 1 774 878, EP 1 776 026, EP 1 893 064, EP 1 912 542, FR 2 424 010, U.S. Pat. Nos. 3,260,190, 4,064,795, 4,760,774, 5,531,152, 6,966,251, 7,131,369, US 2005/0106288, US 2006/0102008, WO 02/074144, WO 03/030696, WO 2005/002405, WO 2005/004683, WO 2005/016093, WO 2005/072574, WO 2005/115206, WO 2006/005736, WO 2006/005756, WO 2006/023309, WO 2006/066626, WO 2007/135136 and WO 2008/037642.

Typically, the existing brewing systems, in particular using pre-portioned flavoring ingredient cartridges, accept a predetermined amount of flavoring ingredient, such as ground coffee or tea leaves, for an extraction cycle to prepare a beverage portion, e.g. for filling a user-recipient such as a cup or a mug. The volume of beverage prepared from such a predetermined amount of flavoring ingredient depends on the amount of liquid circulated through this amount of flavoring ingredient.

For instance, the quantity of water that is recommended for preparing different coffee types varies from coffee to coffee type. Typically, a ristretto requires 25 ml of water. An espresso will normally need between 40 and 60 ml of water. A lighter lungo should be prepared with about 110 ml. A still lighter American-type coffee will require 150 to 300 ml. Hence, the same or similar volume of flavoring ingredient will be used to prepare beverages of significantly different sizes.

A problem to such a beverage preparation configuration is the span of the range of liquid quantity circulated through the same volume of flavoring ingredient. For large size beverage preparations, there is a risk of over-extraction of the flavoring ingredient whereby undesirable compounds end up being washed out of the flavoring ingredient by the large amount of extraction liquid and impair the quality of the beverage. In the case of a coffee preparation, this translates into the extraction of undesired bitter oils from deep inside the coffee ingredient.

A solution to this problem lies in the increase of the amount of flavoring ingredient for preparing large-size beverages compared to small size beverages. This solution is usually implemented to a certain extent in the expensive full-automatic coffee machines that incorporated a coffee bean grinder and a brewing chamber of adjustable size for receiving different volumes of ground coffee.

For machines preparing beverages from pre-portioned flavoring ingredient cartridges, in particular those having an ingredient chamber with a fixed capacity, it would possible to instruct a user to multiply the preparation of small-size beverages using a plurality of cartridges, the small-size beverages being then collected in a single mug for preparing a large-size beverage. However, this puts the burden on the user to adjust the number of cartridges for a given beverage. Moreover, the resulting coffee, i.e. a multiple espresso, may turn out to be significantly stronger than the coffee expected by an American-type coffee drinker.

EP 0 806 168 discloses a coffee filtering apparatus having a hot water circulation line split into a first conduit leading to a presumably conical filter holder with an extraction chamber for ground coffee and into a second conduit by-passing the filter holder. A large coffee pot is fixed via its mouth to the conical filter holder for collecting and storing the prepared coffee, e.g. the equivalent of six cups, dripping from a non-shown opening of the filter holder. The bypass conduit has an outlet that ends over the mouth of the coffee pot when fixed to the conical filter holder. By fixing the large coffee pot to the filter holder, proper positioning is obtained of the mouth of the coffee pot under the filter holder and the bypass conduit.

SUMMARY OF THE INVENTION

A preferred object of the present invention is to provide a beverage preparation machine that alleviates at least some of the abovementioned problems.

Hence, the present invention relates to a beverage preparation machine that has a fluid circuit comprising a liquid flavouring arrangement for circulating a liquid, such as water, through a flavouring ingredient, such as ground coffee or tea leaves, to flavour this liquid and for dispensing this flavoured liquid to a user-receptacle, such as a user-cup or user-mug. The fluid circuit further comprises a dilution arrangement for mixing this liquid unflavoured with the flavoured liquid upon flavouring.

In other words, the beverage preparation machine of the invention is arranged to prepare a large beverage, e.g. an American coffee dispensed into a large coffee mug, by circulating liquid through a flavouring ingredient. However, unlike prior art systems in which all the liquid necessary for preparing the large beverage is circulated through the flavouring ingredient, a first part of the liquid is circulated through the flavouring ingredient for flavouring thereof and a second part of the liquid bypasses the flavouring ingredient and is mixed with the first part of the liquid upon flavouring thereof. Hence, when a lightly flavoured beverage is prepared, a reduced amount of flavouring ingredient can be extracted by the passage of a reduced amount of liquid, the remaining amount of liquid required for preparing the beverage bypassing the flavouring ingredient and being mixed to the flavoured liquid to prevent over-extraction of the flavouring ingredient. Hence, undesirable components resulting from over-extraction can be avoided by such a beverage preparation machine since only a part of the liquid needed for preparing the large size beverage is circulated through the flavouring ingredient.

Such a beverage preparation machine is particularly suitable to prepare a large-size light tea or coffee by infusing small batches of tea leaves or ground coffee as a flavouring ingredient contained in a brewing chamber of the machine.

For instance, the beverage preparation machine is an espresso machine including a brewing chamber having a fixed-volume (capacity) for containing typically 5 to 12 g ground coffee in order to prepare a volume of coffee drink in the range of 25 to 100 ml. By incorporating the dilution arrangement of the invention, the espresso machine can be used to prepare a large size lighter flavoured coffee, such as a volume of American coffee of 200 to 400 ml, from the same volume of flavouring ingredient without over-extraction the limited amount of flavouring ingredient contained in the brewing chamber. For example, 50 to 100 or 120 ml of water is circulated via the chamber containing the ground coffee and the remaining amount of water, e.g. 100 to 350 ml, bypasses the flavouring ingredient, in particular bypasses the ingredient chamber and/or passes via the ingredient chamber after removal of the used flavouring ingredient. The unflavoured water being the mixed with the strongly coffee flavoured water that exits the extraction chamber for diluting and increase the volume of the coffee flavoured water.

Typically, the beverage preparation machine is configured for receiving a cartridge containing a pre-portioned amount of flavouring ingredient and extracting the ingredient by passing liquid through the cartridge, e.g. heated liquid. Such a machine has a cartridge seat and a liquid injection arrangement for injecting liquid into the cartridge seat. The cartridge seat may have a first cartridge support and a second cartridge support facing the first support. The first and second cartridge supports may be arranged to be movable relative to one another from an open position—for insertion or removal of a cartridge into the seat—to a closed position—for passing heated liquid through such a cartridge. At least one support of the cartridge support can be hydraulically actuatable and movable into the closed position by the liquid injection arrangement.

For example, the preparation machine comprises: a beverage preparation unit arranged to receive cartridges for use and evacuate cartridges upon use, e.g. an extraction device; a housing having an opening leading into an area to which cartridges are evacuated from the preparation unit; and a receptacle having a cavity forming a storage space for collecting cartridges evacuated to such an area into the receptacle to a level of fill. The receptacle is insertable into the area for collecting used cartridges and is removable from this area for emptying the collected cartridges.

Examples of such machines are generally disclosed in WO 2009/074550 and in WO 2009/130099. Such prior art machines can be modified to incorporate the dilution arrangement of the present invention.

The fluid circuit of the beverage preparation machine may have a single outlet for dispensing the flavoured and unflavoured liquids to the user-receptacle. In this case, the mixing of the flavoured and unflavoured liquid takes place upstream the outlet. In this configuration, the dilution step takes place inside the machine so that the user confronted to the dispensing of unflavoured liquid into its user-receptacle is not under the wrong impression that there is a problem of extraction of the flavouring ingredient.

Alternatively, the fluid circuit may have a first outlet for dispensing the flavoured liquid and a second outlet for dispensing the unflavoured liquid, the first and second outlets being arranged to direct these liquids to a single user-receptacle filling position below the two outlets. These outlets are normally fixed relative to each other, i.e. not relatively moveable. By avoiding combination of the unflavoured liquid and the flavoured liquid within the fluid circuit, contamination of the unflavoured liquid circuit portion by flavoured liquid from the flavoured liquid outlet is prevented.

Hence, in either configuration, the user will not have to move his/her user-receptacle during the dispensing of his beverage, namely the flavoured and unflavoured liquids into the user-receptacle. The user-receptacle will be able to collect both liquids, the flavoured and the unflavoured liquid, in a single receptacle position below the outlets.

Typically, the first and second outlets are adjacent to each other so as to dispense the flavoured and unflavoured liquids into a user-receptacle located vertically underneath the first and second outlets. The first and second outlets can contact each other or can be distant by a distance of up to 30 mm, in particular less than 20 mm, such as less than 10 mm, optionally less than 5 mm.

The first and second outlets may be arranged one within the other or vice versa. In particular, they may be arranged concentrically. Hence, the first outlet may be arranged around the second outlet or the second outlet may be arranged around the first outlet. Thereby, the dilution of strong or concentrated flavoured liquid by unflavoured liquid takes place downstream these outlets with no risk of cross-contamination of the respective parts of fluid circuit and arrangements.

The distance between the outlets and their orientation should be such that the flavoured and unflavoured liquids may both enter the mouth of a user-receptacle when in a beverage collection position below the outlets for filling the receptacle.

Normally a cup has a mouth with a diameter of 2.5 to 10 cm. A mug may have a mouth with a diameter of 8 to 15 cm. In a typical configuration, only mugs will have to collect liquids from both outlets. Usually, a cup will only have to collect the flavoured liquid from the first outlet. Hence, the beverage preparation machine may have a dispensing configuration, e.g. one or two liquid outlets, for dispensing the flavoured and unflavoured liquids from the fluid circuit to a receptacle filling zone within a notional generally upright virtual cylinder having a diameter in the range of 0.1 to 4 cm, in particular of up to 2 cm, such as up to 1 or 0.5 cm.

The proximity of the first and second outlets, and optionally of at least one further outlet, ensures that regular size drinking cups or mugs do not require any particular positioning arrangement under the outlets to collect liquid therefrom. Hence, the cups and mugs can be easily freely positioned under the outlets and properly collect the liquids dispensed therefrom.

In an embodiment, the fluid circuit has a beverage dispensing head for dispensing the flavoured and unflavoured liquids to a user-receptacle located below the dispensing head. In particular, the dispensing head has a first outlet for dispensing the flavoured liquid and a second outlet for dispensing the unflavoured liquid or a single outlet for dispensing the flavoured and unflavoured liquids. Typically, the beverage dispensing head extends generally horizontally over a beverage dispensing area for positioning a user-receptacle, in particular over a receptacle support device optionally with a drip collection arrangement for collecting waste drips of the unflavoured and flavoured liquids.

Usually, the beverage preparation machine includes a control unit that is associated with the fluid circuit and that is arranged for preparing: a large beverage by dispensing flavoured and unflavoured liquids to a user-mug; and a small beverage by dispensing only flavoured liquid to a user-cup. In particular, the control unit is connected to a user-interface for selecting large and small beverages.

The beverage preparation machine can be arranged to dispense simultaneously flavoured and unflavoured liquids. The machine may be arranged to dispense these liquids sequentially. The dispensing of these liquids may be chronologically overlapping, i.e. partly simultaneous and partly sequential.

Hence, from a single user-operation initiating dispensing of a beverage, e.g. a "one-touch" beverage dispensing, both the flavoured and the unflavoured liquids can be dispensed to a user-receptacle. The dispensing process is thus facilitated for the user and accelerated, the process being particularly fast when the flavoured and unflavoured liquids are dispensed simultaneously.

The fluid circuit usually has at least one pump. The same pump may be used for circulating the liquid in the flavouring arrangement and in the dilution arrangement. The fluid circuit can have a first pump for circulating the liquid in the flavouring arrangement and a second pump for circulating the liquid in the dilution arrangement.

The fluid circuit usually has at least one heater. The same heater may be used for heating the liquid circulated in the flavouring arrangement and the liquid circulated in the dilution arrangement. The fluid circuit may include a first heater for heating the liquid circulated in the flavouring arrangement and a second heater for heating the liquid circulated in the dilution arrangement. Depending on the kind of beverage, it is also possible to heat only the liquid circulated in the flavouring arrangement or only the liquid circulated in the dilution arrangement. This may be the case when the final beverage is supposed to be cold, e.g. ice coffee with or without ice cubes.

It is also possible to set the heating for the flavoured liquid at a temperature different to the heating of the unflavoured liquid, using one heater that with sequential dispensing of the flavoured and unflavoured liquids or two heaters for sequential or simultaneous dispensing of these liquids. This is particularly advantageous when the temperature of the dispensed beverage should be different, e.g. warmer or cooler, to the optimal temperature for extracting the flavouring ingredient.

Using two heaters may also be required to provide enough heating energy of the large volumes of liquids to be heated. Alternatively, a single higher power heater may be used or an instant heater may be used that can heat the required amount of water to prepare large beverage amounts.

The flavouring arrangement typically has a chamber for receiving a flavouring ingredient in particular an infusible ingredient such as ground coffee or tea leaves, optionally supplied within a pre-portioned cartridge. Such an ingredient chamber has an inlet for unflavoured liquid and an outlet for liquid flavoured by circulating through the flavouring ingredient. Normally, the dilution arrangement is arranged for mixing the flavoured and unflavoured liquids downstream the ingredient chamber.

Further features and advantages of the invention will appear in the description of the detailed description.

BRIEF DESCRIPTION OF THE DRAWINGS

The invention will now be described with reference to the schematic drawings, wherein.

DETAILED DESCRIPTION

The invention is now described with reference to the particular embodiments illustrated in FIGS. 1 to 6. The exemplary embodiments are described with particular reference to the field of coffee preparation. However, the invention is also applicable to the preparation of other beverages, in particular such beverages that involve the extraction of a flavouring ingredient, such as tea.

Figure 1:
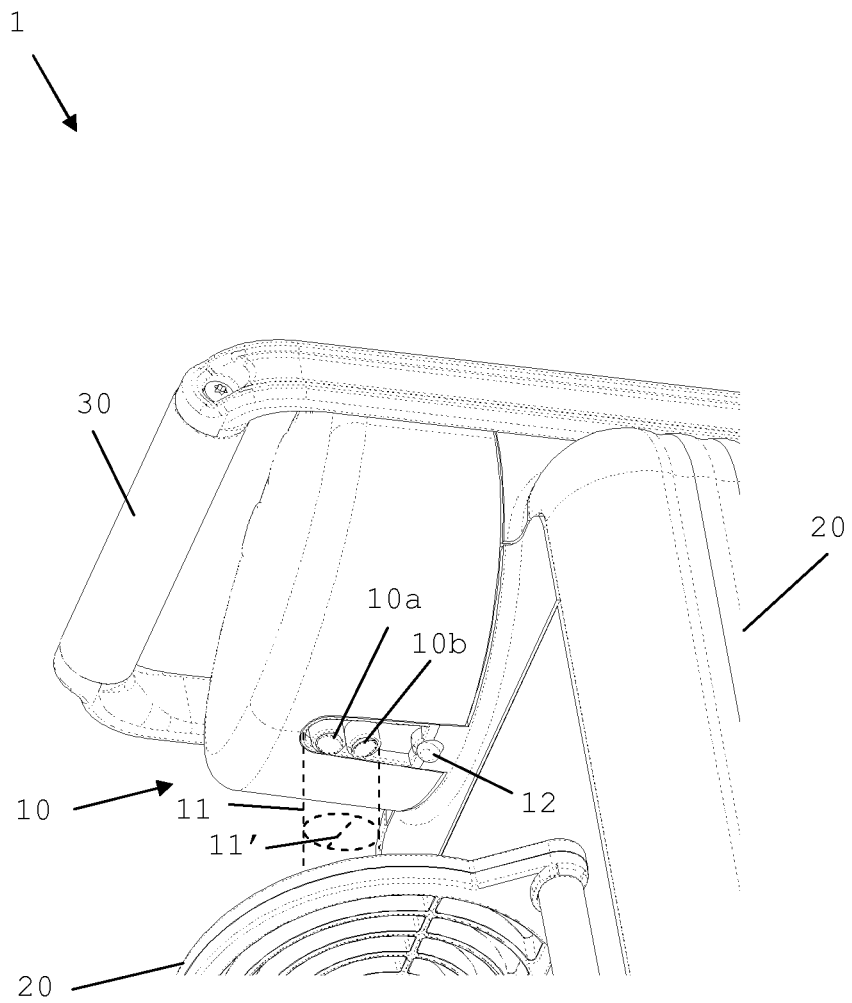
FIG. 1 shows, in a perspective view from below, a dispensing head of a beverage preparation machine.
Figure 2:
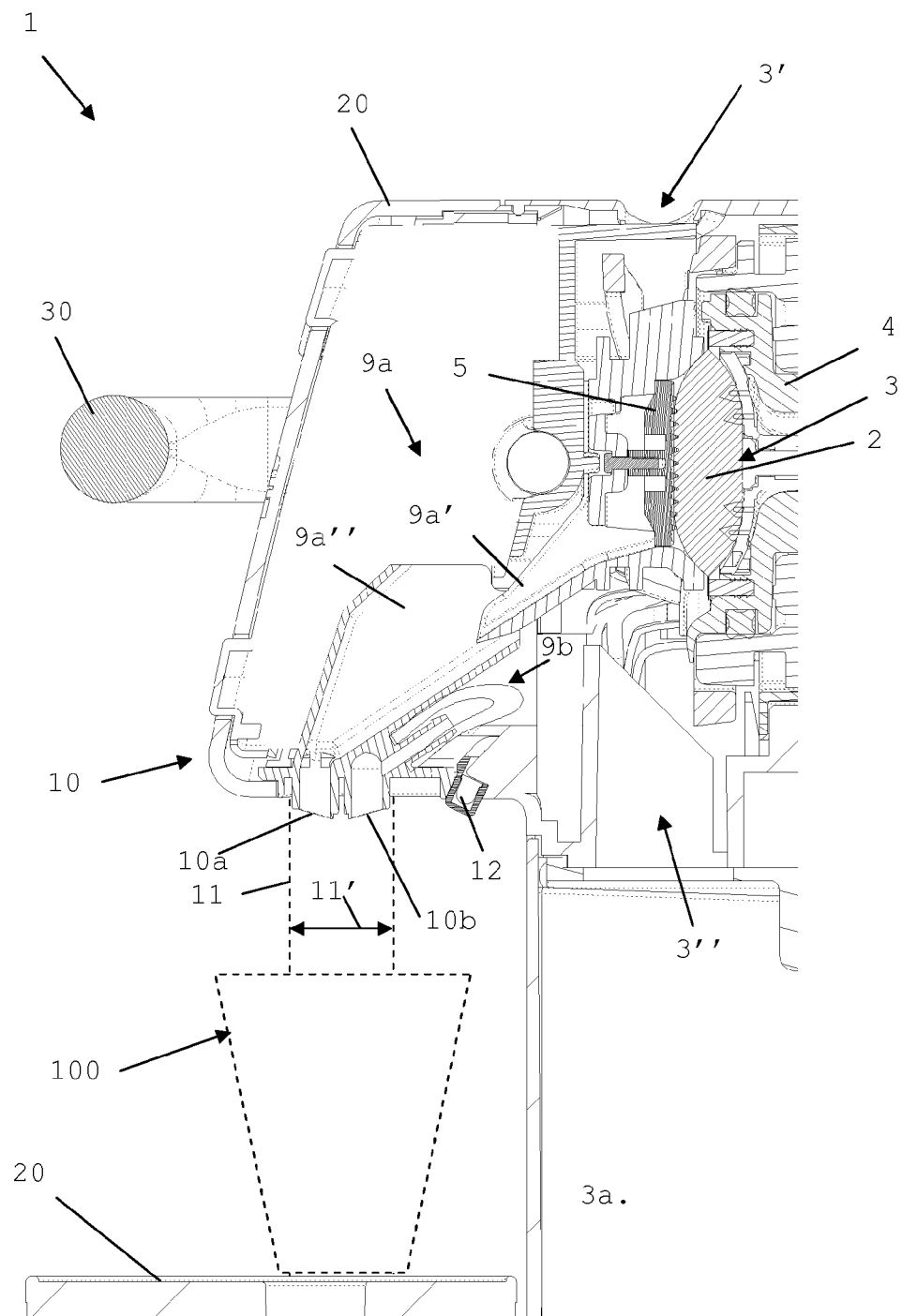
FIG. 2 is a cross-sectional view of the dispensing head of FIG. 1.
Figure 3:
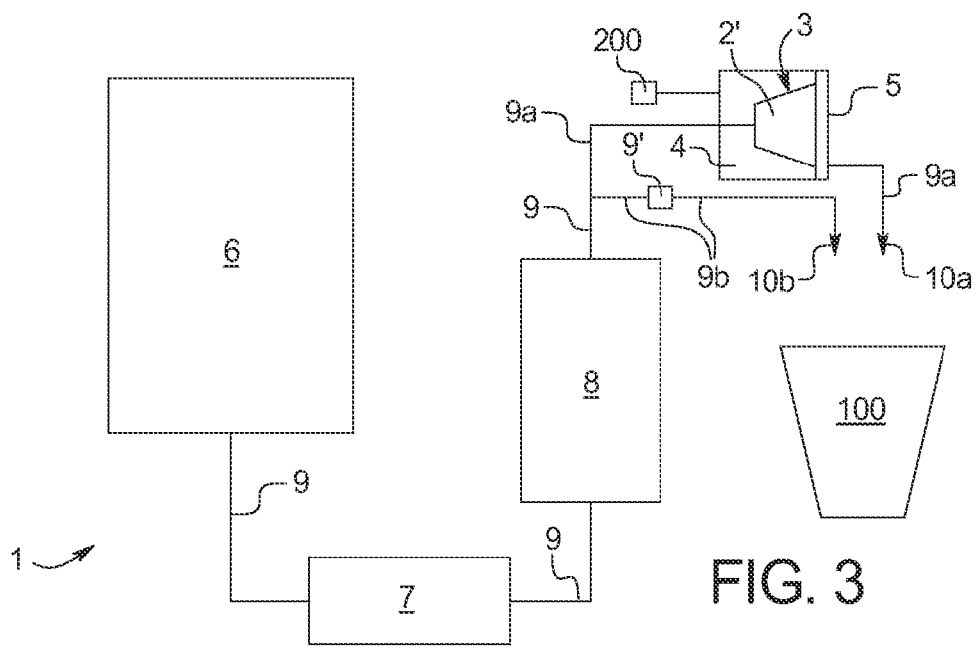
FIGS. 3 and 4 disclose two different embodiments of a fluid circuit of a beverage preparation machine according to the invention.

FIGS. 1 to 3 show part of a machine 1 for preparing coffee by circulating heated liquid, normally water for the preparation of coffee, through an ingredient cartridge in the form of a soft pod 2 or rigid capsule 2', e.g. made of a sealed and air-tight aluminium envelope containing the beverage ingredient e.g. roast and ground coffee, as for example commercialised by NESPRESSO™.

Machine 1 has a fluid circuit 3-10*b* at least partly enclosed in a machine housing 20. Fluid circuit 3-10*b* includes a water flavouring arrangement 3, 4, 5 for circulating water through a flavouring ingredient 2, 2' in the form of ground coffee for flavouring the water with coffee flavours and for dispensing the flavoured water to a user-receptacle 100, such as a user-cup or user-mug.

The water flavouring arrangement 3, 4, 5 is connected to a water source, e.g. a water tank 6, a pump 7, a heater 8 and has a brewing unit 4, 5 with a cartridge seat 3. Brewing unit 4, 5, water tank 6, pump 6, heater 8 are in fluid communication via a conduit system 9, 9*a*.

The brewing unit comprises a first cartridge support 4 and a second cartridge support 5 facing first cartridge support 4. Supports 4, 5 are arranged to receive cartridge 2, 2' in an open spaced apart configuration and to enclose cartridge 2, 2' in a closed urged together extraction configuration. Brewing unit 4, 5 is opened and closed by actuating handle 30. Cartridge seat 3 forms a flavouring ingredient extraction chamber when supports 4, 5 are urged together. Cartridges 2, 2' are introduced into brewing unit 4, 5 in its open configuration via a cartridge introduction channel 3' and removed therefrom upon use via a cartridge evacuation channel 3". Therefrom, used-cartridges 2, 2' descend by gravity, e.g. drop, and are collecting in a used-cartridge collection receptacle 3*a*.

Brewing unit 4, 5 is in fluid communication with outlet 10*a* via a conduit 9*a* that comprises: a spout arrangement 9*a*' into which flavoured liquid drains from brewing unit 4, 5; and a funnel arrangement 9*a*" for guiding the flavoured liquid draining from spout arrangement 9*a*' into outlet 10*a*.

Further details concerning the flavouring arrangement up to and including the brewing unit are for example disclosed in EP 2 070 454, WO 2009/130099 and in particular in EP 09172187 and EP 09177592, the contents of which are hereby incorporated by way of reference.

In accordance with the invention, fluid circuit 3-10b of beverage preparation machine 1 further comprises a dilution arrangement 9', 9b, 10b for mixing the liquid unflavoured, e.g. water from water source 6 and unflavoured by coffee, with the flavoured liquid upon flavouring, e.g. the water flavoured with coffee flavours in extraction chamber 3.

Fluid circuit 3-10b has a dispensing configuration 10a, 10b for dispensing the flavoured and unflavoured liquids from fluid circuit 3-10b to a receptacle filling zone supporting receptacle 100 within a notional virtual dispensing cylinder 11 having a diameter 11' in the range of 0.1 to 4 cm, in particular 0.2 to 2 cm, such as 0.3 to 1 cm.

Fluid circuit 3-10b comprises a first outlet 10a for dispensing the flavoured liquid from chamber 3 via passage 9a and a second outlet 10b for dispensing the unflavoured liquid bypassing chamber 3 via conduit 10b.

First outlet 10a and second outlet 10b are arranged to direct these liquids to a single filling position for a user-receptacle 100 below outlets 10a, 10b. In other words, outlets 9a, 9b are sufficiently close together that receptacle 100 can collect both liquids in a single collection position, i.e. without having to displace receptacle 100 from under one outlet to an under the other outlet. As illustrated in FIG. 2, first and second outlets 10a, 10b are adjacent to each other so as to dispense the flavoured and unflavoured liquids into user-receptacle 100 located vertically underneath first and second outlets 10a, 10b. In this embodiment, first and second outlets 10a, 10b nearly contact each other. Outlets 10a, 10b can for example be spaced apart by a distance of 0.1 to 3 mm.

Fluid circuit 3-10b comprises a beverage dispensing head 10 for dispensing the flavoured and unflavoured liquids to a user-receptacle 100 located below dispensing head 10. As illustrated in FIGS. 1 and 2, dispensing head 10 comprises fixedly mounted therein: first outlet 10a for dispensing the flavoured liquid; and second outlet 10b for dispensing the unflavoured liquid. Dispensing head 10 may be formed as part of the housing or of the frame or of the brewing unit structure of the beverage preparation machine. As illustrated, beverage dispensing head 10 projects out of the machine's main body generally horizontally over a beverage dispensing area for a user-receptacle 100, in particular dispensing head 10 extends over dispensing cylinder 11.

As shown in FIGS. 1 and 2, dispensing head extends overhangingly over a receptacle support device 20 with a drip collection arrangement for collecting waste drips of said unflavoured and flavoured liquids. Such a support arrangement for receptacles is preferably configured for accepting receptacles of different sizes and heights such as small capacity cups and large capacity mugs, for instance as disclosed in EP 1 731 065, EP 1 867 260 or in WO 2006/050769, the contents of which are hereby incorporated by way of reference.

Also illustrated in FIGS. 1 and 2, a light means 12, such as an LED or other light source, are provided above support device 20 for illumination thereof. For instance, light means 12 are used to illuminate device 20 for indicating a state of readiness of beverage preparation machine 1 for receiving a user-recipient 100 and dispense a beverage. Light means 12 may also combine a light emitter and light sensor for detecting the presence and/or size of receptacle 100 when placed under the liquid outlets and/or for sensing the level of fill in receptacle 100 during a beverage dispensing process. Machine 1 may in particular incorporate an arrangement to assist the user for accurately filling the cup to a desired level, as for instance disclosed in WO 2006/063645, WO 2008/138710 and WO 2009/135821. Moreover, light means 12 may be used to prevent large-size beverage dispensing when no receptacle is located underneath outlets 10a, 10b, when an insufficiently large receptacle is located underneath the outlets for collecting a user-requested amount of beverage, or when the receptacle is not located properly under all outlets 10a, 10b required for carrying out a requested dispensing program.

Figure 4:
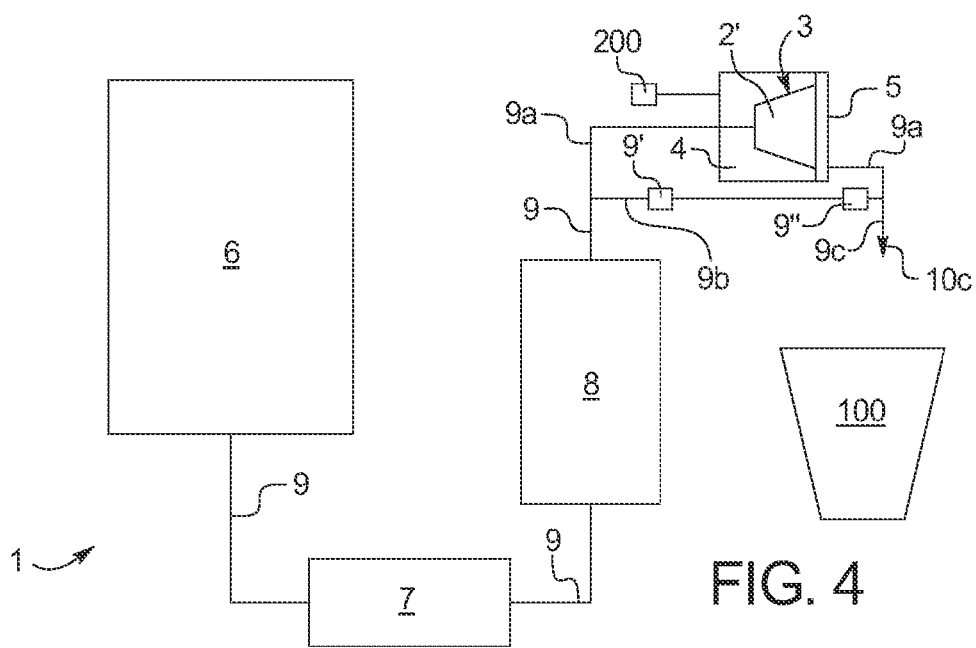

Turning more specifically to FIGS. 3 and 4 which schematically illustrate fluid circuit 3-10c, beverage preparation machines 1 have each a serial arrangement of a water tank 6, a pump 7 and a heater 8 connected by fluid conduits 9. After heater 8, fluid circuit 3-10c has a fluid fork leading: on the one hand to a fluid flavouring arrangement 3, 4, 5, 9a; and on the other hand to a dilution arrangement 9b, 9' bypassing the flavouring arrangement. Dilution arrangement 9b, 9' is configured for mixing the unflavoured liquid, e.g. plain heated water, to the flavoured liquid, e.g. strong coffee.

Thereby, the flavoured liquid is diluted by the unflavoured liquid and the volume dispensed by beverage preparation machine 1 during a beverage preparation batch from a pre-portioned amount of extractible flavouring ingredient 2' is increased. It follows that lighter and larger beverages can be obtained and dispensed from a single pre-portioned amount of extractible flavouring ingredient 2' without risk of over-extraction thereof.

To adjust the ratio of the mixture of flavoured and unflavoured liquids dispensed by beverage preparation machine 1 during a batch preparation of a large-size beverage, a valve 9' is provided along dilution arrangement 9', 9b. When valve 9' is closed, the liquid flows along conduit 9a and through brewing unit 4, 5 for extracting flavouring ingredient 2'. From there, (concentrated) flavoured liquid is dispensed at outlet 10a downstream brewing unit 4, 5 and flows into user-receptacle 100, such as a small-size cup or a large-size mug. When valve 9' is open, the liquid flows along conduit 9b, namely the path of least resistance, bypasses brewing unit 4, 5, and is dispensed from outlet 10b into recipient 100. In this case, the mixing of flavoured and unflavoured liquids takes place outside machine 1. The flavoured and unflavoured liquid dispensing process can be sequential depending on the open and closed state of valve 9'.

As a variation, in the embodiment shown in FIG. 4 in which the same references designate the same elements, fluid circuit 3-9c, 10c comprises a single outlet 10c connected via a common fluid conduit 9c to: brewing unit 4, 5 supplying flavoured liquid via conduit 9a; and bypassing channel 9b supplying unflavoured liquid, for dispensing both flavoured and unflavoured liquids into user-recipient 100. In this case, the flavouring arrangement and the bypassing arrangement are not separated in the fluid circuit and there is a risk of contamination of the dilution arrangement with flavoured liquid. This problem may be solved, if necessary, by introducing a check valve or anti-return valve 9" downstream dilution arrangement 9', 9b and/or by rinsing dilution arrangement upon use.

Figure 5:
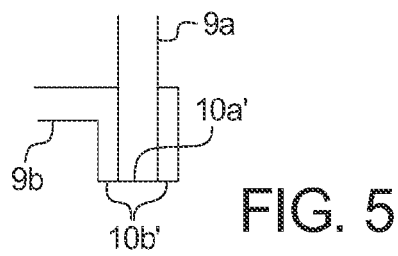
FIGS. 5 and 6 disclose two possible beverage outlet configurations for a beverage preparation machine according to the invention.
Figure 6:
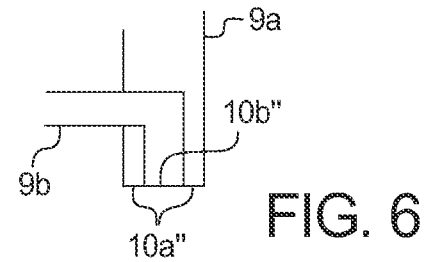

In a further configuration, as disclosed in FIGS. 5 and 6, it is possible to provide a first outlet 10a', 10a" for the flavoured liquid and a second outlet 10b', 10b" for the unflavoured liquid, one outlet being located within the other, in particular concentrically. In this case, even though the downstream part of the flavouring arrangement 4, 5, 9a and of the dilution arrangement 9', 9b are distinct, i.e. the mixture of flavoured and unflavoured liquids takes place downstream outlets 10a', 10a", 10b', 10b", these outlets appear to a user to form a single outlet. Consequently, an undesirable impression that the beverage is cut with water, as result from the preparation of a beverage using the machines illustrated in FIGS. 1 to 3, may be avoided while preventing any contamination of the dilution arrangement with flavoured liquid.

In FIG. 5, unflavoured liquid outlet 10b' is arranged around flavoured liquid outlet 10a'. In FIG. 6, flavoured liquid outlet 10a" is arranged around unflavoured liquid outlet 10b".

Valve 9' may be a variable flow valve that may be so controlled to permit circulation of the liquid simultaneously in flavouring arrangement 4, 5 and in the dilution arrangement 9', 9b so that flavoured and unflavoured liquids are dispensed simultaneously from outlet (s) 10a, 10a', 10a", 10b, 10b', 10b", 10c.

Beverage preparation machine 1 may in particular include a control unit 200 that is associated with fluid circuit 3, 10c and that is arranged for preparing: a large beverage by dispensing flavoured and unflavoured liquids to a user-mug; and a small beverage by dispensing only flavoured liquid to a user-cup. The control unit 200 is in particular connected to a user-interface for selecting large and small beverages, as known in the art of beverage preparation machines, in particular coffee machines.

The invention claimed is:

1. A beverage preparation machine having a fluid circuit comprising:
   a liquid flavoring arrangement for circulating a liquid through a flavoring ingredient to flavor the liquid and for dispensing the flavored liquid to a user-cup,
   a dilution arrangement for mixing the liquid unflavored with the flavored liquid upon flavoring,
   a first outlet for dispensing the flavored liquid, and a second outlet for dispensing the unflavored liquid, the first outlet and the second outlet arranged to direct the flavored and unflavored liquids to a single filling position for the user-cup below the first and second outlets,
   and the fluid circuit has a dispensing configuration for dispensing the flavored and unflavored liquids from the fluid circuit to a receptacle filling zone within a notional virtual dispensing cylinder having a diameter of 0.1 to 2 cm, the receptacle filling zone arranged to support the user-cup in the single filling position in which the user-cup collects the flavored and unflavored liquids below the first and second outlets, and the dispensing configuration is selected from the group consisting of (i) the first and second outlets are in contact with each other to dispense the flavored and unflavored liquids, respectively, into the user-cup located vertically underneath the first and second outlets, (ii) the first and second outlets are adjacent to each other by a distance less than 20 mm to dispense the flavored and unflavored liquids, respectively, into the user-cup located vertically underneath the first and second outlets, (iii) the first outlet is arranged within the second outlet, and (iv) the second outlet is arranged within the first outlet.

2. The machine of claim 1, wherein the notional virtual dispensing cylinder has a diameter of 0.1 to 1 cm.

3. The machine of claim 1, wherein the first and second outlets are relatively fixed to each other.

4. The machine of claim 3, wherein the first outlet is arranged within the second outlet.

5. The machine of claim 3, wherein the second outlet is arranged within the first outlet.

6. The machine of claim 3, wherein the first and second outlets are concentric with each other.

7. The machine of claim 1, wherein the fluid circuit comprises a beverage dispensing head for dispensing the flavored and unflavored liquids to the user-receptacle located below the dispensing head.

8. The machine of claim 1, comprising a control unit that is associated with the fluid circuit and that is arranged for preparing: a first beverage by dispensing flavored and unflavored liquids to a user-mug; and a second beverage that is smaller than the first beverage by dispensing only flavored liquid to the user-cup.

9. The machine of claim 1, which is arranged to dispense simultaneously flavored and unflavored liquids.

10. The machine of claim 1, which is arranged to dispense sequentially flavored and unflavored liquids.

11. The machine of claim 1, wherein the fluid circuit comprises at least one pump for circulating the liquid in the flavoring arrangement and circulating the liquid in the dilution arrangement.

12. The machine of claim 1, wherein the fluid circuit comprises at least one heater for heating the liquid circulated in the flavoring arrangement and the liquid circulated in the dilution arrangement.

13. The machine of claim 1, wherein the flavoring arrangement comprises a chamber for receiving a flavoring ingredient, the ingredient chamber having an inlet for unflavored liquid and an outlet for liquid flavored by circulating through the flavoring ingredient.

14. The machine of claim 1, wherein the fluid circuit comprises a beverage dispensing head for dispensing the flavored and unflavored liquids to the user-receptacle located below the dispensing head, the dispensing head being configured to:
   comprise the first outlet for dispensing the flavored liquid and the second outlet for dispensing the unflavored liquid ; and
   extend generally horizontally over a beverage dispensing area for said user-receptacle, the beverage dispensing area comprising a receptacle support device with a drip collection arrangement for collecting waste drips of said unflavored and flavored liquids.

15. The machine of claim 1, wherein the first outlet dispenses the flavored liquid directly to the single filling position for the user-cup and the second outlet dispenses the unflavored liquid directly to the single filling position for the user-cup.

16. The machine of claim 1, wherein the first and second outlets are adjacent to each other by a distance less than 5 mm.

17. The machine of claim 8, further comprising a user interface connected to the control unit, the user interface configured to accept user input identifying a selected beverage from the first beverage and the second beverage.

18. A beverage preparation system comprising a machine having a fluid circuit comprising:
   a liquid flavoring arrangement for circulating a liquid through a flavoring ingredient to flavor the liquid and for dispensing the flavored liquid to a user-receptacle;
   a dilution arrangement for mixing the liquid unflavored with the flavored liquid upon flavoring;
   a pre-portioned flavoring ingredient cartridge that is contained in the ingredient chamber of the machine;
   a first outlet for dispensing the flavored liquid, and a second outlet for dispensing the unflavored liquid, the first outlet and the second outlet arranged to direct the flavored and unflavored liquids to a single filling position for the user-receptacle below the first and second outlets;
   and the fluid circuit has a dispensing configuration selected from the group consisting of (i) the first and second outlets are in contact with each other to dispense the flavored and unflavored liquids, respectively, into the user-cup located vertically underneath the first and second outlets, (ii) the first and second outlets are adjacent to each other by a distance less than 20 mm to dispense the flavored and unflavored liquids, respectively, into the user-cup located vertically underneath the first and second outlets, (iii) the first outlet is arranged within the second outlet, and (iv) the second outlet.

19. The system of claim 18, wherein the first outlet dispenses the flavored liquid directly to the single filling position for the user-receptacle and the second outlet dispenses the unflavored liquid directly to the single filling position for the user-receptacle.

\* \* \* \* \*